(12) United States Patent
Smith et al.

(10) Patent No.: US 7,281,460 B2
(45) Date of Patent: Oct. 16, 2007

(54) POSITIVE LOCK TAIL STOCK SUPPORT FOR LATHE

(75) Inventors: John C. Smith, Denver, NC (US); Kendall Smith, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 290 days.

(21) Appl. No.: 11/021,474

(22) Filed: Dec. 23, 2004

(65) Prior Publication Data

US 2006/0096423 A1   May 11, 2006

Related U.S. Application Data

(60) Provisional application No. 60/547,735, filed on Dec. 24, 2003.

(51) Int. Cl.
*B23B 21/00* (2006.01)
*B23B 3/00* (2006.01)

(52) U.S. Cl. .......................................... 82/148; 82/154

(58) Field of Classification Search .................. 82/148, 82/117, 154; 144/16, 114; 142/7
See application file for complete search history.

(56) References Cited

U.S. PATENT DOCUMENTS 4,995,434 A * 2/1991 Christiansen ................. 142/48
5,282,402 A * 2/1994 Cady et al. .................... 82/117

* cited by examiner

*Primary Examiner*—Willmon Fridie, Jr.
(74) *Attorney, Agent, or Firm*—Mehul R. Jani; Adan Ayala

(57) ABSTRACT

The present invention generally relates to the field of woodworking tools and particularly to an indexing assembly for a lathe. An aspect of the present invention is directed to a lathe, including a frame; a bed coupled with the frame; a head stock configured for mechanically engaging a first end of a workpiece, the head stock being coupled with the bed; and a tail stock, including a housing, the housing including a fine adjustment assembly for mechanically engaging with a second end of the workpiece, wherein the tail stock is adjustably and slidably coupled with the bed via an indexing assembly, the indexing assembly configured to provide the lathe with positive locking capabilities.

19 Claims, 4 Drawing Sheets

POSITIVE LOCK TAIL STOCK SUPPORT FOR LATHE

CROSS-REFERENCE TO RELATED APPLICATIONS

The present application claims priority under 35 U.S.C. § 119(e) to U.S. Provisional Application No. 60/547,735 entitled: Positive Lock Tail Stock Support For Lathe filed Dec. 24, 2003, which is hereby incorporated by reference in its entirety.

FIELD OF THE INVENTION

The present invention generally relates to the field of woodworking tools, and particularly to an indexing assembly for a lathe.

BRIEF DESCRIPTION OF THE DRAWINGS

The numerous advantages of the present invention may be better understood by those skilled in the art by reference to the accompanying figures in which.

BACKGROUND OF THE INVENTION

Figure 1:
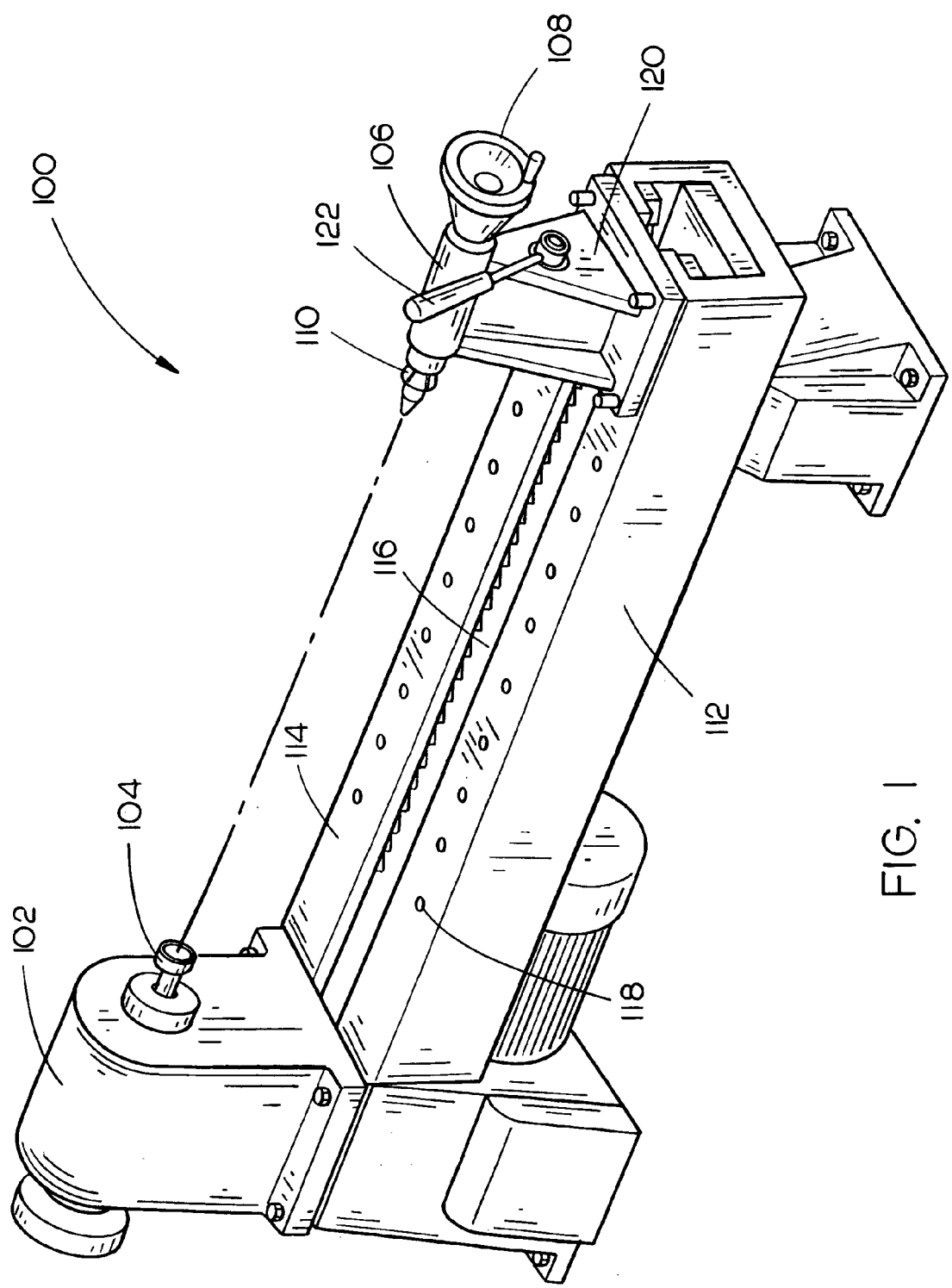
FIG. 1 is an isometric view of a lathe in accordance with an exemplary embodiment of the present invention.

Lathes may be utilized with various workpieces of varying size and shape. Therefore, it is important for a lathe to be configured to accommodate various workpieces in a manner which allows the workpiece to be adequately secured by the lathe during cutting and shaping operations. Further, it is important to be able to quickly and conveniently adjust the lathe to accommodate a wide range of workpieces having various sizes and shapes. Current systems do not always allow a lathe operator to make adjustments in a time efficient fashion. Also, current systems are not always configured to secure workpieces in a stable manner during cutting and shaping operations.

Therefore, it would be advantageous to have a lathe, suitable for adjustably accommodating a variety of different sized workpieces in both a time-efficient and secure manner. It would be further advantageous to have a lathe having a tail stock with positive locking capabilities which provides for time-efficient adjustability and improved stability when securing a workpiece.

SUMMARY OF THE INVENTION

Accordingly, a first aspect of the present invention is directed to a lathe, including a frame; a bed coupled with the frame; a head stock configured for mechanically engaging a first end of a workpiece, the head stock being coupled with the bed; and a tail stock, including a housing, the housing including a fine adjustment assembly for mechanically engaging with a second end of the workpiece, wherein the tail stock is adjustably and slidably coupled with the bed via an indexing assembly, the indexing assembly configured to provide the lathe with positive locking capabilities.

A second aspect of the present invention is directed to a lathe, including a frame; a bed coupled with the frame, the bed having first and second bedways, the bedways defining a guide path, the guide path defining the length of the bed, the bed including a plurality of indexing receivers disposed on a surface of each bedway, the bed further including a lock platen engagement assembly disposed on a surface of the bed proximal to the guide path; a head stock configured for mechanically engaging a first end of a workpiece, the head stock being coupled with the bed; and a tail stock, including a housing, the housing including a fine adjustment assembly for mechanically engaging with a second end of the workpiece, the tail stock configured for mechanically engaging with the guide path and the indexing receivers, wherein the tail stock is adjustably and slidably coupled with the bed via an indexing assembly, the indexing assembly including a selector assembly, a pin assembly and a lock assembly, the indexing assembly configured to provide the lathe with positive locking capabilities.

A third aspect of the present invention is directed to a lathe, including a frame; a bed coupled with the frame, the bed having first and second bedways, the bedways defining a guide path, the guide path defining the length of the bed, the bed including a plurality of indexing receivers disposed on a surface of each bedway, the bed further including a lock platen engagement assembly disposed on a surface of the bed proximal to the guide path; a head stock configured for mechanically engaging a first end of a workpiece, the head stock being coupled with the bed; and a tail stock, including a housing, the housing including a fine adjustment assembly for mechanically engaging with a second end of the workpiece, the tail stock configured for mechanically engaging with the guide path and the indexing receivers, wherein the tail stock is adjustably and slidably coupled with the bed via an indexing assembly, the indexing assembly including a selector assembly, a pin assembly, a lock assembly and a compression lock system, the indexing assembly configured to provide the lathe with positive locking capabilities, the selector assembly being a handle configured as a multi-position handle, the pin assembly including a plurality of spring-loaded pins operationally coupled with the handle, the pins configured for mechanically engaging with the indexing receivers, the lock assembly including a lock platen coupled with the housing and operationally coupled with the handle, the lock platen configured for mechanically engaging with the lock platen engagement assembly.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

DETAILED DESCRIPTION OF THE INVENTION

Reference will now be made in detail to the presently preferred embodiments of the invention, examples of which are illustrated in the accompanying drawings.

Referring generally now to FIGS. 1 through 5, exemplary embodiments of the present invention are shown. In a present embodiment, a lathe 100 includes a frame coupled with a bed. In further embodiments, the bed is removably coupled with the frame and configured for being retro-fitted with a secondary frame.

In the present embodiment, the bed is further coupled with a head stock 102. In a preferred embodiment, the head stock is configured for mechanically engaging with a first end of a workpiece. For example, the head stock may be configured with a motor driven main spindle 104 for mechanically engaging with a first end of a workpiece.

In a current embodiment, the lathe 100 further includes a tail stock 106 adjustably coupled with the bed. In a preferred embodiment, the tail stock is configured for mechanically engaging with a second end of the workpiece. For instance, the tail stock may include a tail stock handwheel 108 operationally coupled with a tail stock ram 110 for engaging with and securing a second end of the workpiece during cutting or shaping operations.

In further embodiments, the head stock 102 and the tail stock 106 are removably coupled with the bed. For example, the head stock 102 and the bed may have one or more threaded receivers for receiving a fastener, such as a bolt, which allow for coupling of the head stock 102 with the bed. Further, the tail stock 106 may be adjustably coupled with the bed in such a manner that it may be slidably removed from the end of the bed. It is understood that various tool assemblies may be coupled with the bed and enabled to adjust in position relative to the bed, head stock, and tail stock.

The bed includes a first bedway 112 and a second bedway 114. The first and second bedways 112 and 114 define the length of the bed. In the current embodiment, the bed is a single continuous unit. In further embodiments, the bed may be two or more portions removably connected together, such as by a fastener.

In an exemplary embodiment, the first and second bedways 112 and 114 define a travel guide 116 which may be slidably and mechanically engaged by the tail stock 106 as will be described below. For example, the travel guide 116 may be a slot between the first and second bedways. It is understood that the configuration of the travel guide 116 may vary as contemplated by those of ordinary skill in the relevant art. For example, the travel guide 116 may be established as first and second slots within the bed or the like. In alternative embodiments, the tail stock wraps around or encompasses the sides of the bed and travels along or within a travel guide established along the sides of the bed. In the present embodiment, the travel guide 116 runs the full length of the bed. In additional embodiments, the travel guide 116 may define an area less than the full length of the bed.

In a current embodiment, the top sides, in the orientation such as observed in FIGS. 1-5, of the first and second bedways 112 and 114 are disposed with a plurality of indexing receivers 118. The indexing receivers 118 may be established in various configurations. For example, the indexing receivers may be established as holes, recesses, slots and the like within the first and second bedways 112 and 114. In an exemplary embodiment, the plurality of indexing receivers on the first bedway 112 are aligned with the plurality of indexing receivers on the second bedway 114. In additional embodiments, it is contemplated that the indexing receivers may be established in various positions. The indexing receivers 118 assist in enabling positive locking of the tail stock 106 with the bed.

The plurality of indexing receivers 118 further assist in the adjustment of the tail stock 106 relative to the bed. For example, the plurality of indexing receivers of each bedway may be established at set distances from one another in order to provide incremental adjustment capabilities to the tail stock. For instance, the plurality of indexing receivers 118 may be spaced apart by one inch, three-quarters of an inch, one-half an inch, and the like. The range of spacing established between each of the plurality of indexing receivers 118 may vary as contemplated by those of ordinary skill.

In the present embodiment, the plurality of indexing receivers 118 may be established along the full length of the first and second bedways 112 and 114, in corresponding location to one another. Thus, the plurality of indexing receivers 118 may enable the tail stock 106 to be positioned along the length of the bed. In further embodiments, the plurality of indexing receivers 118 may also be established in limited sections of the first and second bedways 112 and 114.

Figure 4:
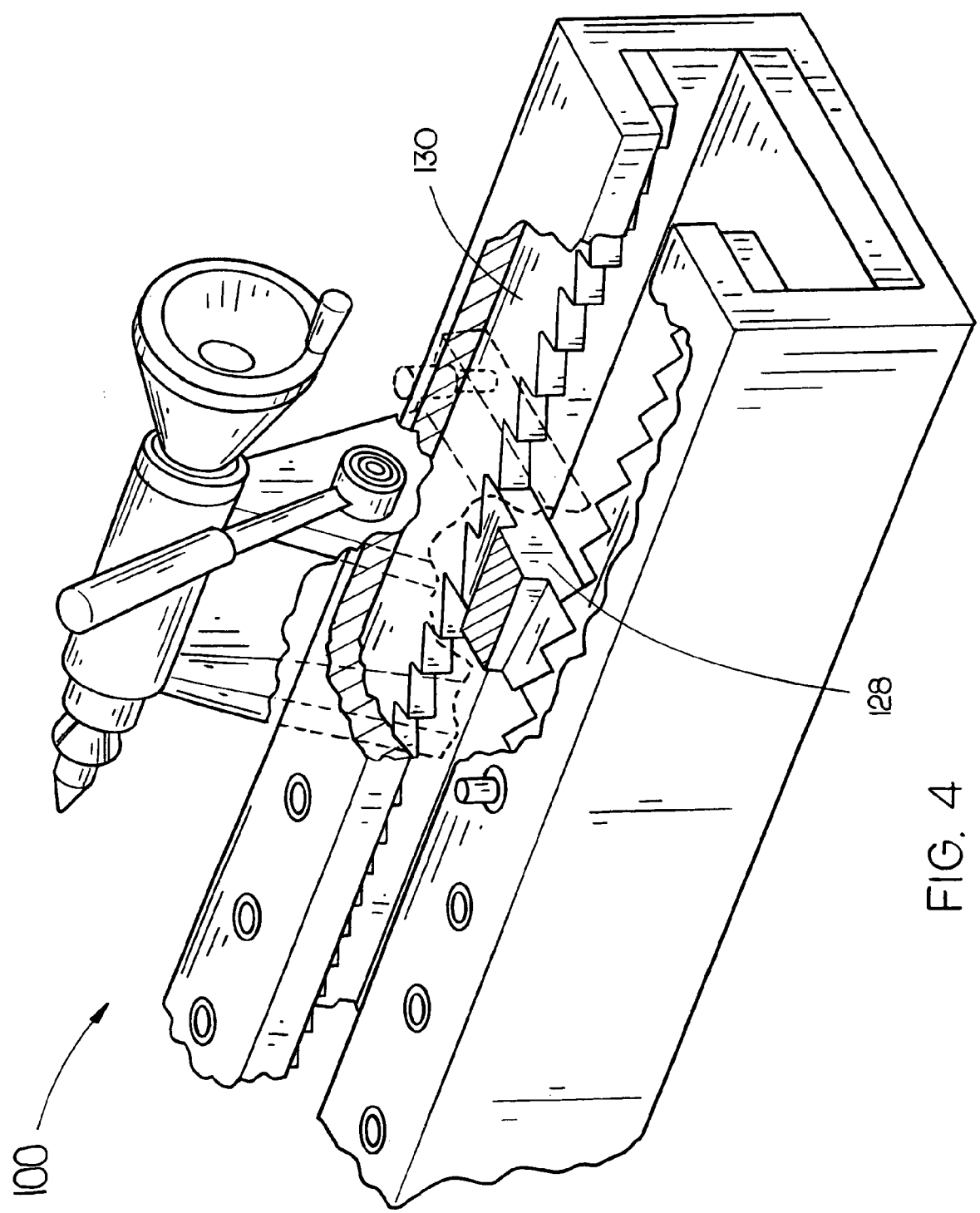
FIG. 4 is an isometric sectional view illustrating a bottom side of the bed, including a lock platen engagement assembly, and a lock platen engaged therewith.

In the present embodiment, the bed has disposed along the length of its bottom side, and proximal to the travel guide 116, a lock platen engagement assembly 130. In the current embodiment, the lock platen engagement assembly 130 provides for the engagement of a lock platen 128, described below, against the first and second bedways 112 and 114. An exemplary toothed configuration of the lock platen engagement assembly is illustrated in FIG. 4. The toothed configuration, which includes two corresponding rows of teeth provides a configuration suitable for engagement with the lock platen 128. It is understood that the configuration of the lock platen engagement assembly 130 may be varied to enable the adjustable capabilities and the securing of the lock platen 128 against the lock platen engagement assembly 130. It is further understood that the lock platen engagement assembly may be configured to accommodate various lock platen shapes and bed designs.

In an exemplary embodiment, the tail stock 106 includes a housing 120 having a fine adjustment assembly for mechanically engaging with a second end of a workpiece. In the present embodiment, the fine adjustment assembly includes a tail stock handwheel 108 operationally coupled, such as by a threaded rod, worm drive, rack and pinion assembly or the like, with a tailstock ram 110 for mechanically engaging a workpiece. For example, manipulation of the handwheel 108 causes the ram 110 to rotate and move towards a workpiece, thereby allowing the ram to engage with and secure a second end of the workpiece. The fine adjustment assembly allows for securing of a workpiece within ranges defined by the indexing receivers 118.

In the present embodiment, the lathe 100 further includes an indexing assembly. The indexing assembly includes a selector assembly operationally coupled with a pin assembly and a lock assembly. It is understood that the indexing assembly provides for the adjustable coupling of the tail stock 106 with the bed of the lathe 100 and assists in providing the lathe with positive locking capabilities. In an exemplary embodiment, the selector assembly is a handle 122, enabled as a multi-position handle. For example, the handle may be movable bi-directionally in a vertical plane.

Figure 3:
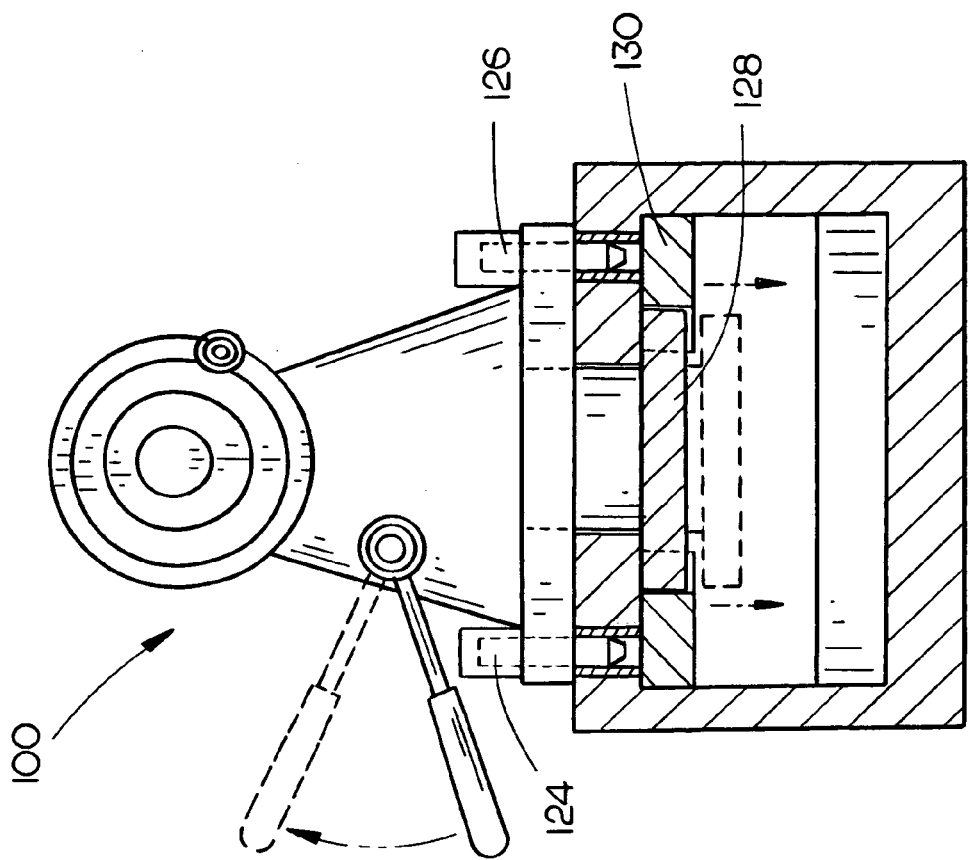
FIG. 3 is a sectional view of the lathe including the tail stock coupled with the bed, the tail stock enabling the indexing assembly including the first and second pin to engage in a second position relative to the first and second indexing receiver of the bed of the lathe in accordance with an exemplary embodiment of the present invention.
Figure 2:
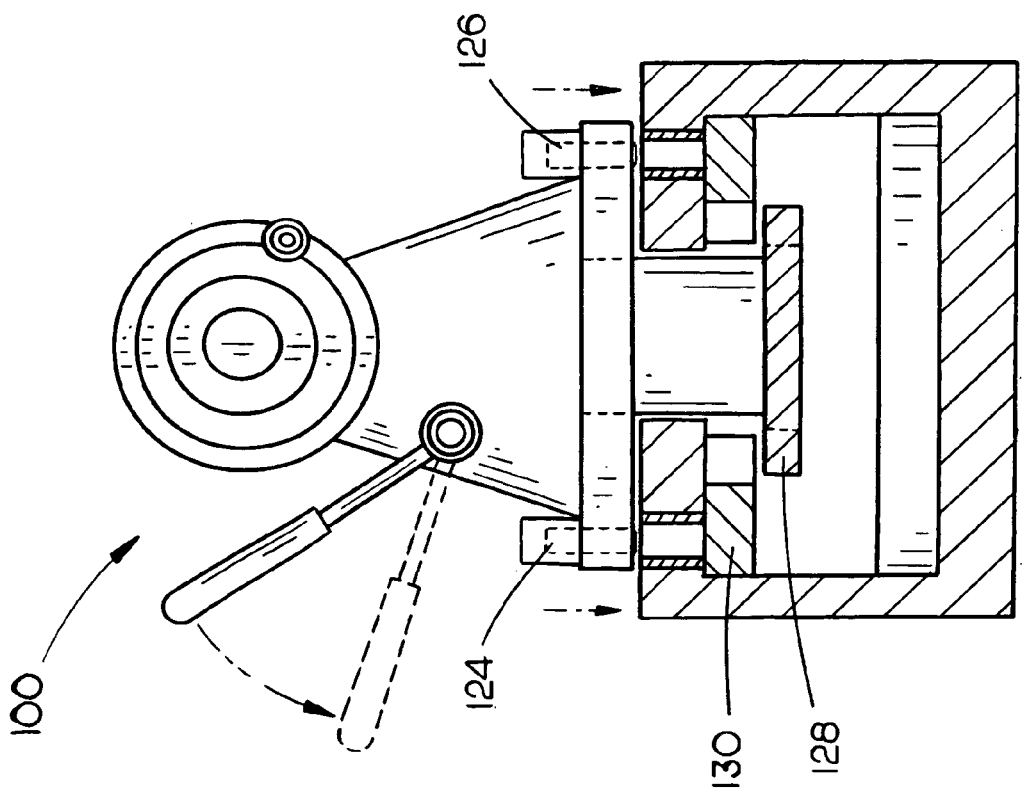
FIG. 2 is a sectional view of the lathe including a tail stock coupled with a bed, the tail stock enabling an indexing assembly including a first and second pin to engage in a first position relative to a first and second indexing receiver of the bed of the lathe in accordance with an exemplary embodiment of the present invention.
Figure 5:
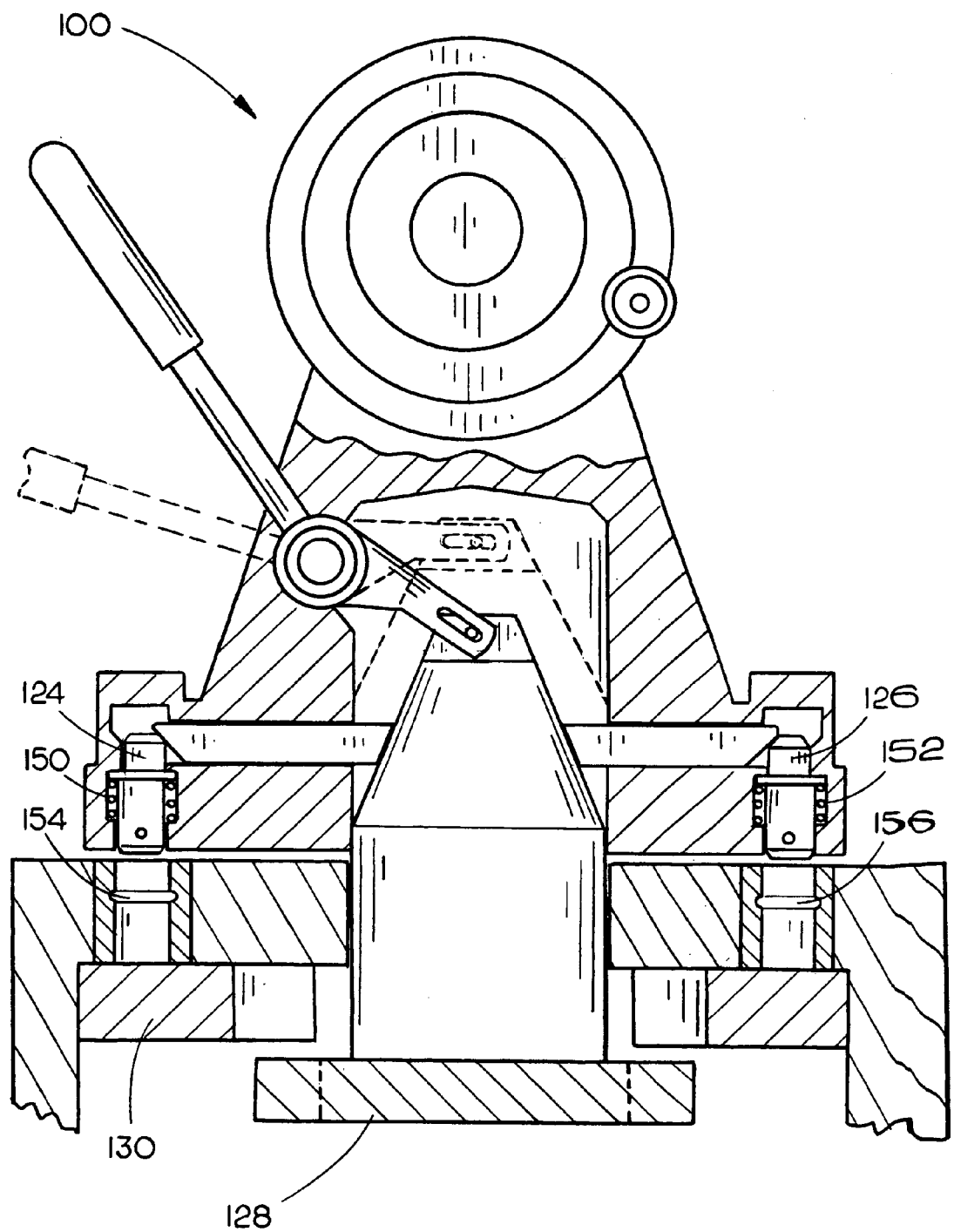
FIG. 5 is a sectional view of the lathe including the tail stock coupled with the bed, the tail stock enabling the indexing assembly including the first and second pin and a compression lock system to engage with the first and second indexing receiver of the bed of the lathe in accordance with an exemplary embodiment of the present invention.

In the present embodiment, the pin assembly includes a first pin 124 and a second pin 126 which may be extended from and retracted into the housing 120 as shown in FIGS. 2 and 3. In an exemplary embodiment, the first and second pins 124 and 126 are spring-loaded pins which are operationally coupled with the handle 122, such as by a camming assembly as illustrated in FIG. 5. The camming assembly, upon manipulation of the handle 122 into a raised position, provides an outward force on the spring-loaded pins 124 and 126, thereby forcing the pins downward into the indexing receivers 118 and securing the tail stock 106. In a further embodiment, the handle 122, may be operationally coupled with the spring-loaded pins via a rack and pinion assembly. It is contemplated that various means may be used to operationally couple the handle with the spring-loaded pins 124 and 126. The handle 122 provides the lathe operator control over the spring-loaded pins. In further embodiments, the pin assembly may include more than two pins.

In a current embodiment, the handle 122 may be established in a first position. The first position is the "raised" position with the handle pulled or placed in its uppermost position. With the handle 122 so positioned, the first and second spring loaded pins 124 and 126 of the pin assembly are established in a first pin position, being retracted into the housing 120 of the tail stock 106 thereby allowing the tail stock 106 to be adjusted relative to the bed. In the exemplary embodiment, the tail stock 106 is slidably adjustable with respect to the bed. Thus, with the pins retracted, the tail stock may be slid along the length of the bed until a desired position for the tail stock is achieved. It is contemplated that various adjustment mechanisms may be employed to enable the tail stock's movement along the length of the bed. For example, a rack and pinion assembly may be employed with a handle that may be engaged by the user of the lathe to re-position the tail stock. Other mechanisms, as contemplated by those of skill in the art, may be employed without departing from the scope and spirit of the present invention.

In the current embodiment, the handle 122 may be established in a second "pin engagement" position in order to establish the tail stock 106 in the desired position on the bed. In the second position, the first and second spring-loaded pins 124 and 126 are established in a second pin position, wherein the pins come down from the housing 120 and each pin engages within one of the plurality of indexing receivers 118 established within the bed. It is understood that the pins 124 and 126, when not engaged within the plurality of indexing receivers 118 of the bed are in an at least partially retracted position, unable to extend under the pressure of the springs. As the tail stock 106 is slid along the bed, the first and second pins 124 and 126 may be moved over the indexing receivers 118. As the pins are moved over the indexing receivers, the springs coupled with the pins apply a force which extends the pins into the indexing receivers. With the pins extended into the indexing receivers, the tail stock is secured in a position relative to the bed. In the current example, the pin assembly provides a horizontal securing force, locking the position of the tail stock relative to the horizontal axis established by the bed.

It is contemplated that the indexing assembly, through the pin assembly, may provide a securing effect in more than the horizontal axis. For example, the first and/or second pin of the pin assembly, may include a compression lock system disposed on a section of the first and/or second pin which engages within one of the plurality of indexing receivers. In an exemplary embodiment, illustrated in FIG. 5, the compression lock system includes spring-loaded ball bearings 150 and 152 disposed within each spring-loaded pin 124 and 126. When the pins are fully engaged within the indexing receivers 118, the ball bearings are forced by the spring into corresponding ball bearing receivers 154 and 156, disposed within the indexing receivers 118. Once the pins 124 and 126 are received within the indexing receivers 118 the handle 122 may be established in a third "lock" position. The lock position operationally engages the lock assembly and operates to secure the tail stock in the vertical axis relative to the horizontal axis established by the bed. The lock position is established when the handle is forced into its down most position. The compression lock system provides for the securing of the tail stock in both the vertical and horizontal axes with respect to the bed of the lathe 100. It is understood that the indexing assembly may include a mechanism for retracting the springs which engage against the ball bearings, thereby allowing the ball bearings to disengage from the ball bearing receiver and enabling the pins to be retracted within the housing of the tail stock. It is contemplated that the mechanism may be disposed on the handle of the selector assembly, such as by a button or switch, and/or established as an additional component disposed on the housing, separate from the handle.

Further, while an exemplary system of adjustment is described herein, it is contemplated that various other systems as contemplated by those of ordinary skill in the art may be employed. In further embodiments, it is understood that the system of adjustment may be enabled with various automation capabilities. For example, the selector assembly may be established which, when engaged by the operator of the lathe, automatically establishes the indexing assembly in a desired position. It is understood that the number of positions and the location of the handle established in each of the various positions may vary as contemplated by those of ordinary skill in the art. Further, the indexing assembly may enable its functionality employing a variety of mechanisms, such as a push button assembly, switch assembly, and the like.

In a present embodiment, the lock assembly includes a lock platen 128 coupled with the housing and operationally coupled with the handle 122. In an exemplary embodiment, operational coupling may be achieved via a camming assembly, as illustrated in FIG. 5. In operation, the lock platen extends 128 from the housing into the travel guide 116. The lock platen 128 is configured to engage against the lock platen engagement assembly 130 disposed on the bottom side of the first and second bedways 112 and 114 of the bed. The engagement of the lock platen 128 within the lock platen engagement assembly 130 provides for a vertical securing of the tail stock 106 against the bed. Thus, when the handle 122 is in the pin engagement or lock position, the lock platen 128 is engaged with the lock platen engagement assembly 130. It is understood that when the handle is established in a position which is neither the pin engagement or lock position, the lock platen 128 is not engaged against the lock platen engagement assembly 130. This dis-engagement capability of the lock platen further assists in the sliding adjustment capability of the tail stock relative to the bed. It is contemplated that various means may be used to operationally couple the handle with the lock platen 128.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof.

What is claimed is:

1. A lathe, comprising:
   a frame;
   a bed coupled with the frame;
   a head stock configured for mechanically engaging a first end of a workpiece, the head stock being coupled with the bed; and
   a tail stock, including a housing, the housing including a fine adjustment assembly for mechanically engaging with a second end of the workpiece,
   wherein the tail stock is adjustably and slidably coupled with the bed via an indexing assembly, the indexing assembly configured to provide the lathe with positive locking capabilities, and
   wherein the indexing assembly of the tailstock includes a selector assembly, a pin assembly, and a lock assembly.

2. A lathe as claimed in claim 1, wherein the bed is a continuous unit having first and second bedways, the bedways defining a guide path for mechanically engaging with the tail stock, the guide path defining the length of the bed.

3. A lathe as claimed in claim 2, wherein the bed further includes a plurality of indexing receivers disposed on a surface of each bedway, the indexing receivers configured for mechanically engaging with the tail stock.

4. A lathe as claimed in claim 3, wherein the bed further includes a lock platen engagement assembly disposed on a surface of the bed proximal to the guide path.

5. A lathe as claimed in claim 4, wherein the selector assembly is a multi-position handle.

6. A lathe as claimed in claim 5, wherein the pin assembly includes a plurality of spring-loaded pins operationally coupled with the handle, the pins configured for mechanically engaging with the indexing receivers.

7. A lathe as claimed in claim 6, wherein the lock assembly includes a lock platen coupled with the housing and operationally coupled with the handle, the lock platen configured for mechanically engaging with the lock platen engagement assembly.

8. A lathe as claimed in claim 7, wherein when the handle is in a raised position, the spring-loaded pins are disengaged from the indexing receivers and are retracted within the housing of the tail stock and the lock platen is disengaged from the lock platen engagement assembly, thereby allowing the tail stock to be adjustably and slidably positioned along the guide path.

9. A lathe as claimed in claim 7, wherein when the handle is in a pin engagement position, the spring-loaded pins extend from the housing of the tail stock and are mechanically engaged within the indexing receivers and the lock platen is mechanically engaged with the lock platen engagement assembly, thereby fixing the position of the tail stock along the guide path.

10. A lathe, comprising:
    a frame;
    a bed coupled with the frame, the bed having first and second bedways, the bedways defining a guide path, the guide path defining the length of the bed, the bed including a plurality of indexing receivers disposed on a surface of each bedway, the bed further including a lock platen engagement assembly disposed on a surface of the bed proximal to the guide path;
    a head stock configured for mechanically engaging a first end of a workpiece, the head stock being coupled with the bed; and
    a tail stock, including a housing, the housing including a fine adjustment assembly for mechanically engaging with a second end of the workpiece, the tail stock configured for mechanically engaging with the guide path and the indexing receivers,
    wherein the tail stock is adjustably and slidably coupled with the bed via an indexing assembly, the indexing assembly including a selector assembly, a pin assembly, and a lock assembly, the indexing assembly configured to provide the lathe with positive locking capabilities.

11. A lathe as claimed in claim 10, wherein the selector assembly is a multi-position handle.

12. A lathe as claimed in claim 11, wherein the pin assembly includes a plurality of spring-loaded pins operationally coupled with the handle, the pins configured for mechanically engaging with the indexing receivers.

13. A lathe as claimed in claim 12, wherein the lock assembly includes a lock platen coupled with the housing and operationally coupled with the handle, the lock platen configured for mechanically engaging with the lock platen engagement assembly.

14. A lathe as claimed in claim 13, wherein when the handle is in a raised position, the spring-loaded pins are disengaged from the indexing receivers and are retracted within the housing of the tail stock and the lock platen is disengaged from the lock platen engagement assembly, thereby allowing the tail stock to be adjustably and slidably positioned along the guide path.

15. A lathe as claimed in claim 13, wherein when the handle is in a pin engagement position, the spring-loaded pins extend from the housing of the tail stock and are mechanically engaged within the indexing receivers and the lock platen is mechanically engaged with the lock platen engagement assembly, thereby fixing the position of the tail stock along the guide path.

16. A lathe, comprising:
    a frame;
    a bed coupled with the frame, the bed having first and second bedways, the bedways defining a guide path, the guide path defining the length of the bed, the bed including a plurality of indexing receivers disposed on a surface of each bedway, the bed further including a lock platen engagement assembly disposed on a surface of the proximal to the guide path;
    a head stock configured for mechanically engaging a first end of a workpiece, the head stock being coupled with the bed; and
    a tail stock, including a housing, the housing including a fine adjustment assembly for mechanically engaging with a second end of the workpiece, the tail stock configured for mechanically engaging with the guide path and the indexing receivers,
    wherein the tail stock is adjustably and slidably coupled with the bed via an indexing assembly, the indexing assembly including a selector assembly, a pin assembly, a lock assembly, and a compression lock system, the indexing assembly configured to provide the lathe with positive locking capabilities, the selector assembly being a multi-position handle, the pin assembly including a plurality of spring-loaded pins operationally couple with the handle, the the pins configured for mechanically engaging with the indexing receivers, the lock assembly including a lock platen coupled with the housing and operationally coupled with the handle, the lock platen configured for mechanically engaging with the lock platen engagement assembly.

17. A lathe as claimed in claim 16, wherein the compression lock system includes one or more spring-loaded ball bearings disposed within one or more of the spring-loaded pins, the spring-loaded ball bearings configured for being received within the indexing receivers and further configured for locking the tail stock in position along the guide path when the handle is in one of a pin engagement position or a locked position.

18. A lathe as claimed in claim 16, wherein when the handle is in a raised position, the spring-loaded pins are disengaged from the indexing receivers and are retracted within the housing of the tail stock and the lock platen is disengaged from the lock platen engagement assembly, thereby allowing the tail stock to be adjustably and slidably positioned along the guide path.

19. A lathe as claimed in claim 16, wherein when the handle is in a pin engagement position, the spring-loaded pins extend from the housing of the tail stock and are mechanically engaged within the indexing receivers and the lock platen is mechanically engaged with the lock platen engagement assembly, thereby fixing the position of the tail stock along the guide path.

* * * * *